US008814121B2

(12) United States Patent
Koberg

(10) Patent No.: US 8,814,121 B2
(45) Date of Patent: Aug. 26, 2014

(54) STABILIZER PAD AND HANDLE APPARATUS

(71) Applicant: Richard and Carolyn Koberg Living Trust, Panora, IA (US)

(72) Inventor: Richard Koberg, Panora, IA (US)

(73) Assignee: Richard and Carolyn Koberg Living Trust, Panora, IA (US)

( * ) Notice: Subject to any disclaimer, the term of this patent is extended or adjusted under 35 U.S.C. 154(b) by 11 days.

(21) Appl. No.: 13/633,576

(22) Filed: Oct. 2, 2012

(65) Prior Publication Data

US 2014/0091189 A1 Apr. 3, 2014

(51) Int. Cl.
*A47B 91/00* (2006.01)

(52) U.S. Cl.
USPC ............... 248/346.01; 248/519; 248/910

(58) Field of Classification Search
USPC .......... 248/519, 145.6, 146, 500, 910, 510, 248/346.01; 135/16, 98; D8/374, 354; 254/418–425
See application file for complete search history.

(56) References Cited

U.S. PATENT DOCUMENTS

| 3,176,676 | A | * | 4/1965 | Caldwell | 126/25 A |
|---|---|---|---|---|---|
| 3,415,475 | A | * | 12/1968 | Goodman | 248/158 |
| D282,241 | S | * | 1/1986 | Sauber | D8/373 |
| 5,377,976 | A | * | 1/1995 | Matherne et al. | 473/483 |
| 5,427,346 | A | * | 6/1995 | Urgola | 248/519 |
| 5,979,844 | A | * | 11/1999 | Hopkins | 248/158 |
| 7,040,659 | B2 | | 5/2006 | Lagsdin | |
| 7,073,821 | B2 | | 7/2006 | Lagsdin | |
| 7,172,216 | B1 | | 2/2007 | Lagsdin | |
| 7,398,664 | B1 | | 7/2008 | Weinerman | |
| 7,802,814 | B2 | | 9/2010 | Lagsdin | |
| 7,896,789 | B2 | * | 3/2011 | Hinton et al. | 482/141 |
| 8,333,134 | B1 | * | 12/2012 | Duffy | 81/121.1 |
| 2006/0185408 | A1 | | 8/2006 | Graham | |

FOREIGN PATENT DOCUMENTS

| CN | 202140760 U | * | 2/2012 | ............. F16M 11/20 |
|---|---|---|---|---|
| CN | 202698012 U | * | 1/2013 | ............. A45B 25/00 |

OTHER PUBLICATIONS

Photographs—three—of prototype of handle (photo1) and of multiple stabilizer pads stacked one on the other (photos 2 and 3), non-confidential disclosure offer for sale occurring Mar. 17, 2011.
Koberg, U.S. Appl. No. 29/433,634, filed Oct. 2, 2012.

* cited by examiner

*Primary Examiner* — Alfred J Wujciak
(74) *Attorney, Agent, or Firm* — Patricia A. Sweeney

(57) ABSTRACT

A stabilizer pad and handle apparatus is provided having a substantially C-shaped handle, or U-shaped handle with ends of the handle inserted into seating holes extending inwardly from the side walls of the pad. An anchor hole and anchor means may be provided extending downward through and perpendicular to the seating holes and through the handle. The pad may be rectangular or square shape or substantially circular in shape. A substantially trapezoidal recess is provided in the circular pad into which the seating holes are provided, and may be angled inwardly away from the side walls, with the handle provided in the recess. At least a portion of the top surface of the handle may be aligned with the outer circumference formed by the circular shape of the pad. The circular pad may be rolled on its side wall edge. Multiple handle means may be provided.

21 Claims, 8 Drawing Sheets

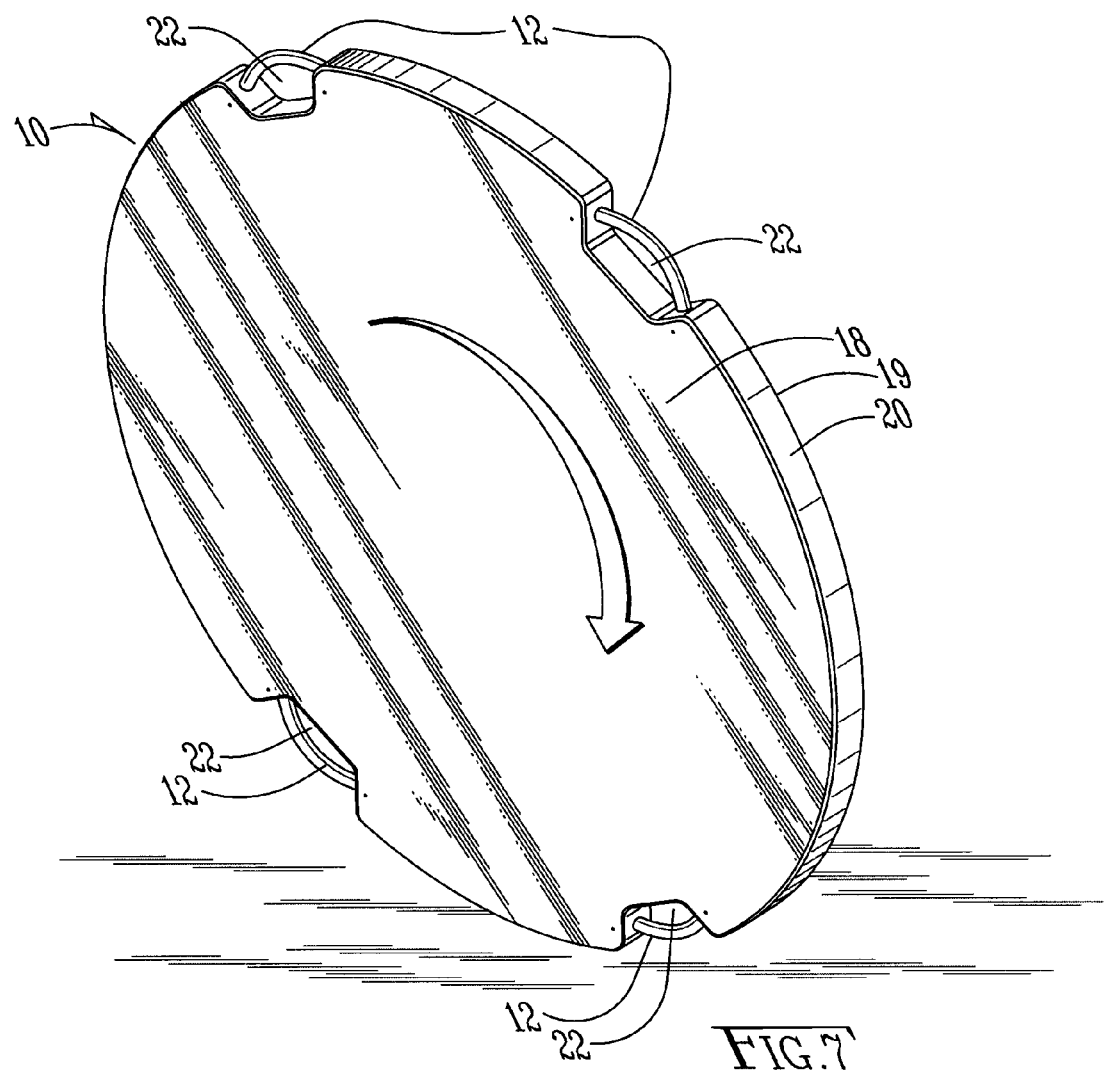

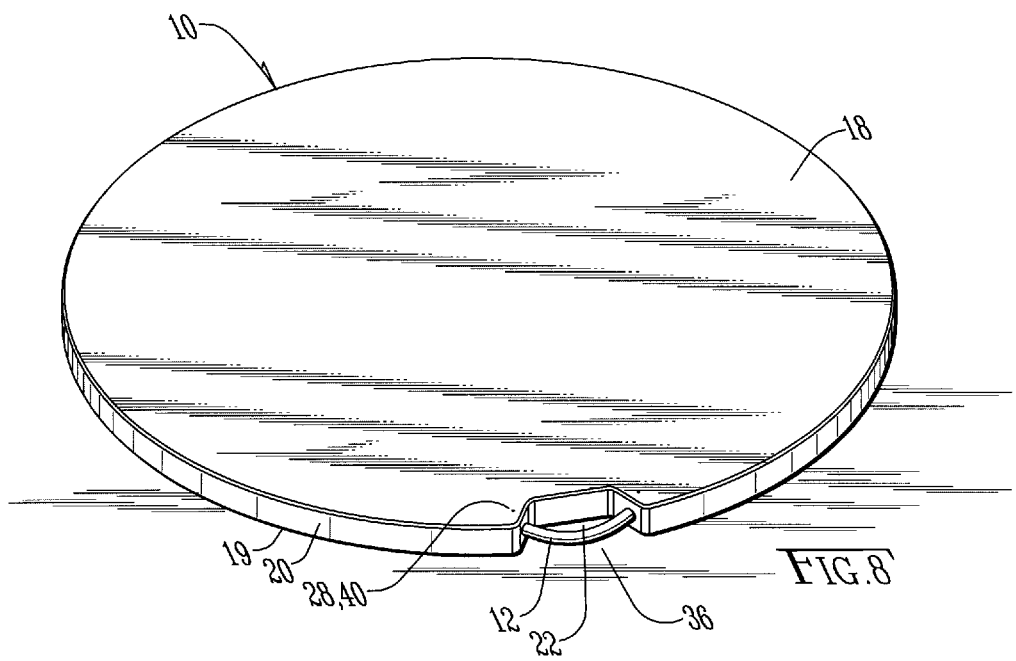

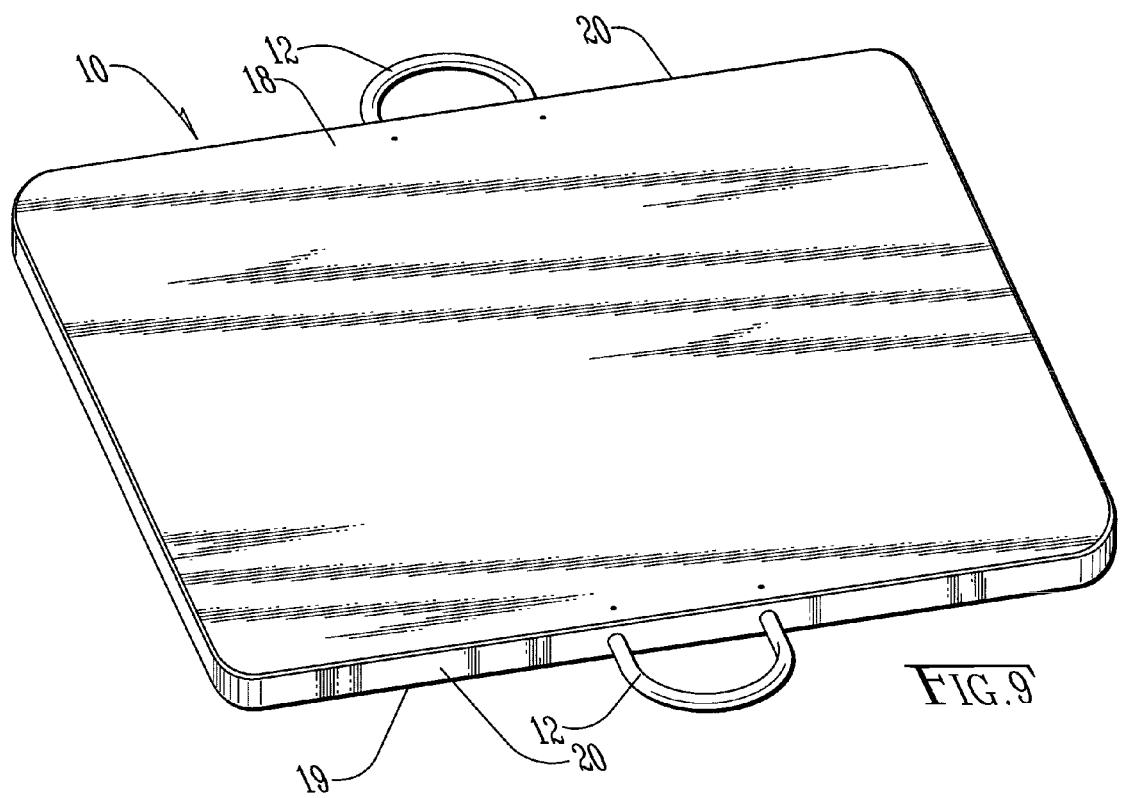

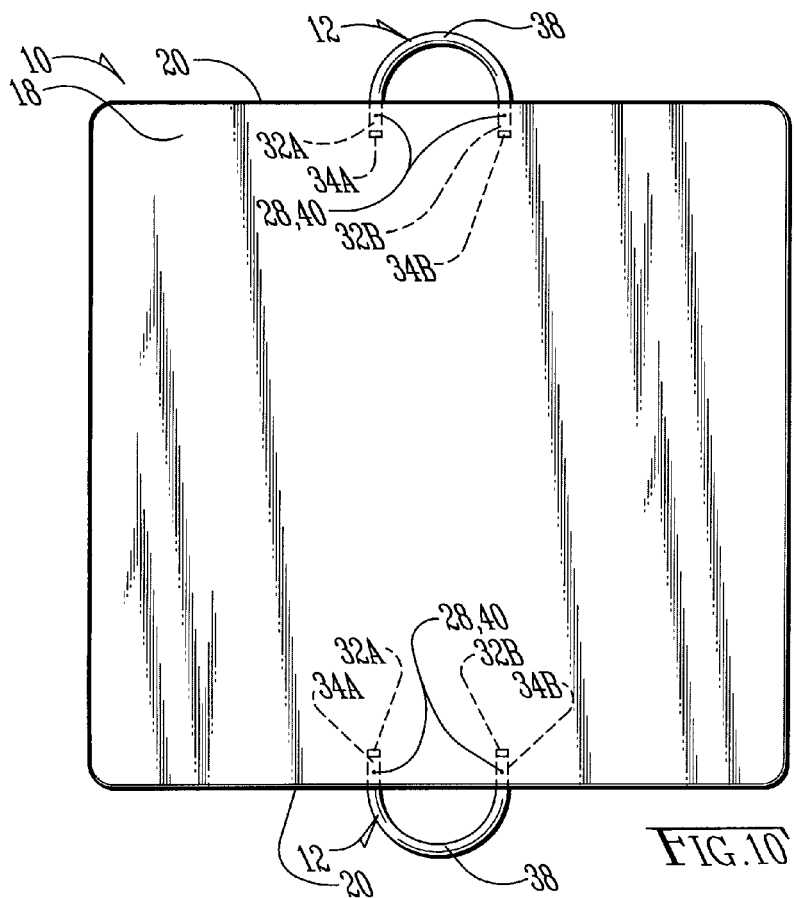
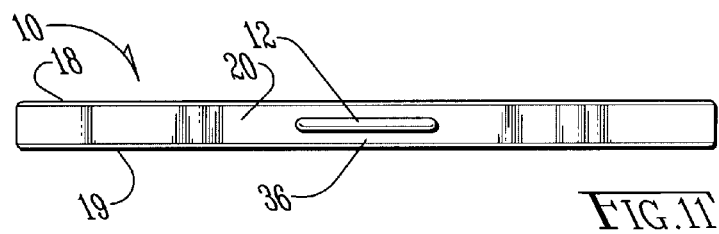
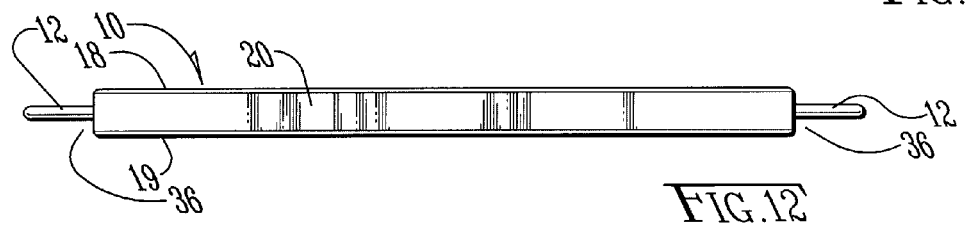

STABILIZER PAD AND HANDLE APPARATUS

BACKGROUND

Stabilizer pads are used in a variety of settings, and particularly to provide a stabilizing foundation for devices which support heavy loads, including heavy equipment such as truck mounted or similar self-propelled devices, construction equipment, cranes, utility trucks and tree care vehicles, recreational vehicles, trailers or the like, where a jack, outrigger or similar support device provides temporary support extending from the main structure. Such devices are then stabilized by use of a stabilizer pad. By way of example, without intending to be limiting, an outrigger may have a stabilizing arm extending outwardly from the equipment and then downwardly and may be hydraulically operated. The arm may rest on a stabilizer platform to disperse the weight. A support or jack for RVs may extend outward or downward from the vehicle. The stabilizer arm and/or platform and/or jack rests on a stabilizer pad. This prevents the stabilizer arm or jack from breaking through the ground surface, whether soil, asphalt or concrete and prevents damage to the stabilizer arm or jack. The pad prevents movement of the support while protecting the support and preventing tipping or rolling over of the equipment. A stabilizer pad generally has a top wall on which the support device rests and a bottom wall in contact with the ground surface.

SUMMARY

A stabilizer pad apparatus is provided comprising a stabilizer pad with at least one handle means comprising a handle, a pair of seating holes, and may include a pair of anchor holes and a pair of anchor means. A stabilizer pad refers to a device which provides stabilization and/or foundation for equipment or a machine, where part or all of the equipment or a supporting device for the equipment or machine rests on the stabilizer pad. For example, a beam, structure, outrigger or other support may project from equipment and aid in supporting the equipment. This is especially useful for heavy equipment such as truck mounted or similar self-propelled devices, heavy construction equipment, cranes, utility trucks, tree care vehicles, recreational vehicles, trailers and the like. The stabilizer pad can provide load distribution, protects the equipment or support from breakage, prevent the equipment or support from breaking through ground surface and inhibits rolling of the equipment or support. Such devices are well known to one skilled in the art and by way of example, common alternative names include outrigger pad(s), dunnage pad(s), crane outrigger pad(s) and RV jack pad(s) and the like.

In an embodiment, the handle means further comprises a recess. The stabilizer pad comprises a top and bottom wall, and at least one downwardly extending side wall with two seating holes extending from and substantially perpendicular to the outer surface of the side wall inwardly for receiving the handle. The handle has a first end and a second end, the first end being placed into one of the two seating holes and the second end into the second seating hole. An embodiment provides the handle is made of rigid material. An embodiment provides the handle is substantially C-shaped, made of material that can be shaped, but is of sufficient strength, shear and tear resistance to not crack, tear or break when being used to pull a stabilizer pad of up to 50 to 100 to 150 or 200 pounds or more. The handle will also be subject to considerable wear and inclement weather conditions and in an embodiment is resistant to weathering. A still further embodiment provides the handle is of solid core design for strength and to maintain anchor means in place. In an embodiment the handle is made of engineered thermoplastic material. In another embodiment the handle is substantially U-shaped. In another embodiment the handle may comprise orange pigment for UV protection and increase visibility. A further embodiment provides the handle may comprise safety orange pigment, using a bright vibrant orange pigmentation that still further improves visibility and safety.

The seating holes are placed in the pad to provide insertion of the handle so that when the pad is placed on a ground surface, there is a gap between the lower surface of the handle and the ground surface to allow for sufficient space beneath the handle so that a human hand, with or without a glove, can be placed below the handle for grasping, or for a mechanical lift mechanism to be attached to the handle for moving the pad.

An anchor hole may be provided in another embodiment combined with an anchor means to affix the handle to the pad. The anchor hole and means extend from the exterior of the pad and through the handle. In an embodiment the anchor hole pairs each extend vertically from the top wall through the pad at a point that intersects the seating hole. The seating hole and anchor hole in an embodiment are substantially perpendicular to each other. The anchor hole may extend past the seating hole into the lower portion of the pad in one embodiment and may extend completely through the bottom wall of the pad in another embodiment. The anchor hole is of a size and shape for receiving an anchor means for securing the handle in place. An anchor means, in one example a pin, is placed in the anchor hole and passes through the handle to anchor the handle in place. In an embodiment the pin has a tip capable of piercing the handle and in a further embodiment has a pointed tip. An embodiment provides the pin is constructed of steel and in another embodiment is constructed of stainless steel. It is understood that when referring to a "top" wall and a "lower" wall it does not matter which wall faces up when the pad is placed on the ground surface, as it is reversible.

The stabilizer pad in an embodiment is rectangular or square in shape and in a further embodiment may have a substantially U-shaped handle as described. The rectangular or square pad will have a top wall, bottom wall and four downwardly depending side walls.

A second embodiment provides for a stabilizer pad that is round, that is, substantially circular in shape. The round pad will have a top wall, a bottom wall and one downwardly depending side wall. The side wall forms the outer perimeter of the circle. Provided in the pad is a recess where the handle is inserted such that at least a portion of the top outer surface of the handle is flush with the outer circumference formed by the circle shape of the pad and which provides space for a hand to be inserted for grasping the handle. It recesses inward from the side wall toward the center of the pad, the recess formed by two side portions and a base portion. In an embodiment the recess is substantially trapezoidal in shape, being formed by the two side surfaces of the side wall extending distally inward toward the interior of the pad. The side surfaces are connected at the distal end by a base surface of the side wall, the base surface being parallel to a line from the proximal edge of one side surface to the proximal edge of the other side surface. An embodiment provides the side surfaces extend distally inwardly at a narrowing incline. A seating hole is provided in each side portion and extends from the outer surface of the side portion into the pad. A first end of the handle is inserted into one seating hole and the second end in the other seating hole to seat the handle. In an embodiment the handle when seated is completely contained within the recess.

In an embodiment the seating hole is aligned such that at least a portion of the top outer surface of the handle is aligned with the outer circumference formed by the round pad. As a result, the pad may be placed on its edge so that a portion of the outer perimeter is on the ground and may be rolled. The shape of the recess is such that a human hand may grasp the handle. In an embodiment the recess is substantially trapezoidal in shape and in an embodiment the side portions incline inward toward each other such that the recess is narrower towards the interior of the pad to accommodate the fingers of a hand and the wider portion at the perimeter allows the palm of the hand to be accommodated, which also allows for removing from the pad as little material as possible.

Still further embodiments provide for more than one handle means on the pad.

BRIEF DESCRIPTION OF THE DRAWINGS

FIG. 7 is a perspective view of the first embodiment of the stabilizer pad and handle apparatus placed on the outer perimeter for rolling.

FIG. 8 is a perspective view of a second embodiment of the stabilizer pad and handle apparatus.

FIG. 9 is a perspective view of a third embodiment of the stabilizer pad and handle apparatus.

FIG. 10 is a top view of the third embodiment of the stabilizer pad and handle apparatus.

FIG. 11 is a front elevation view of the third embodiment of the stabilizer pad and handle apparatus.

FIG. 12 is a side elevation view of the third embodiment of the stabilizer pad and handle apparatus.

DETAILED DESCRIPTION

Figure 1:
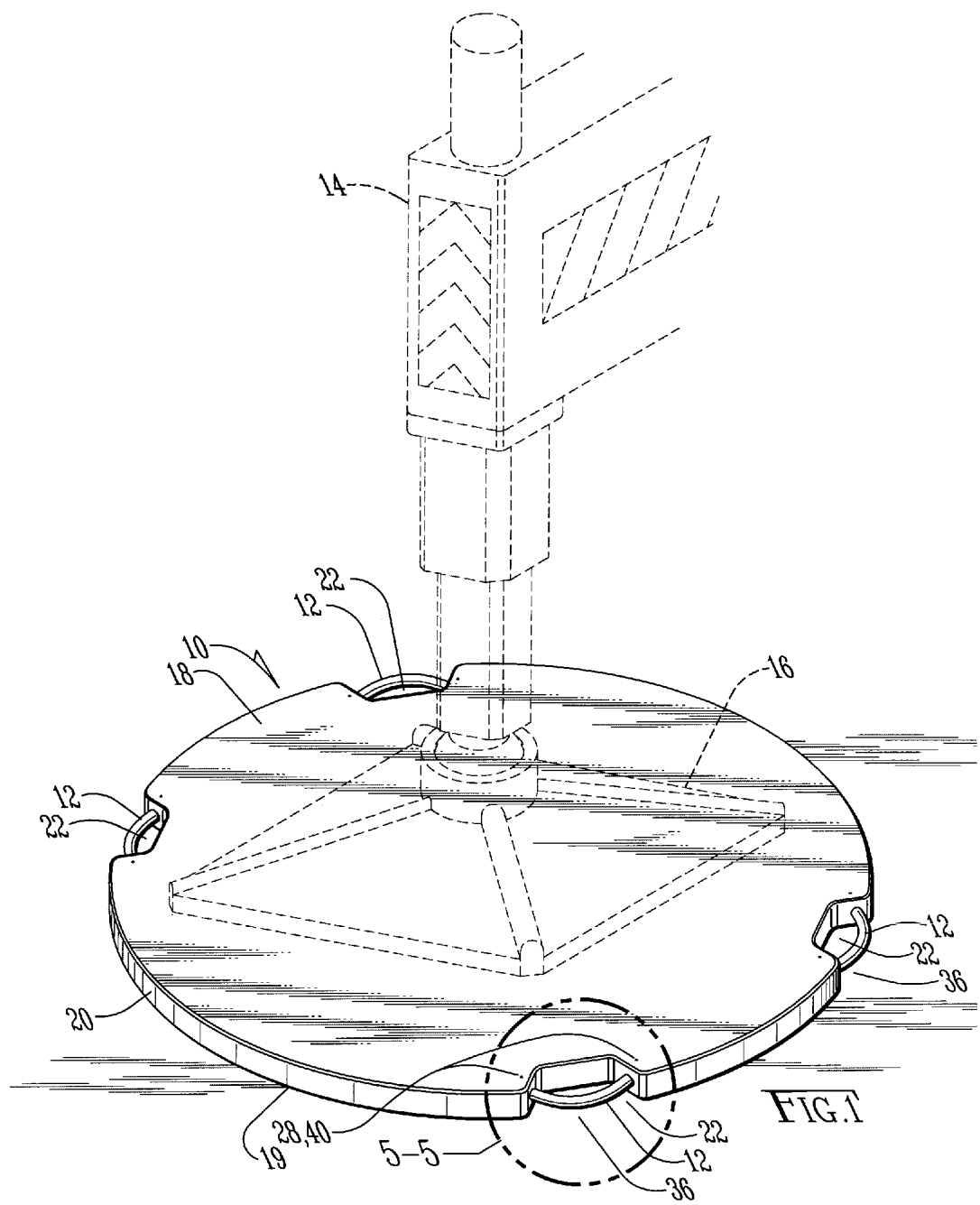
FIG. 1 is a perspective view of a first embodiment of the stabilizer pad and handle apparatus shown below a sample stabilizer arm and platform.
Figure 2:
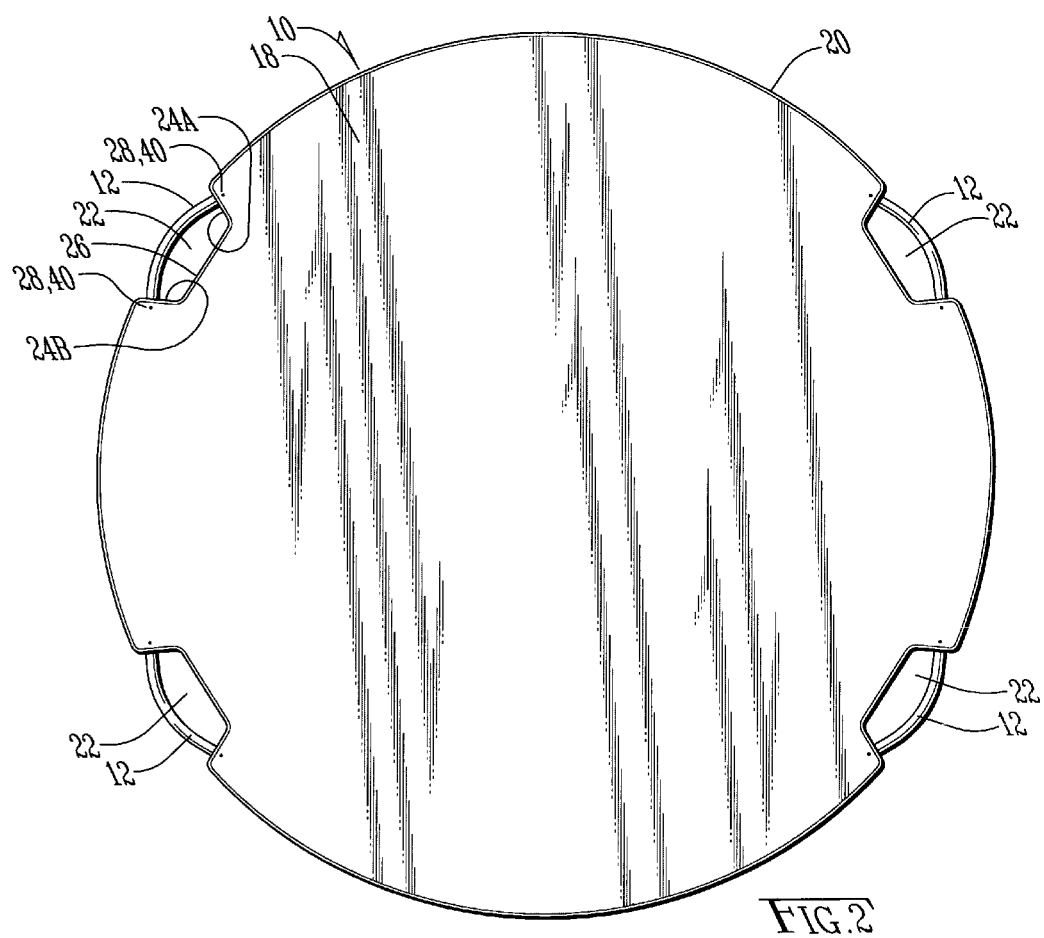
FIG. 2 is a top view of the first embodiment the stabilizer pad and handle apparatus.
Figure 3:
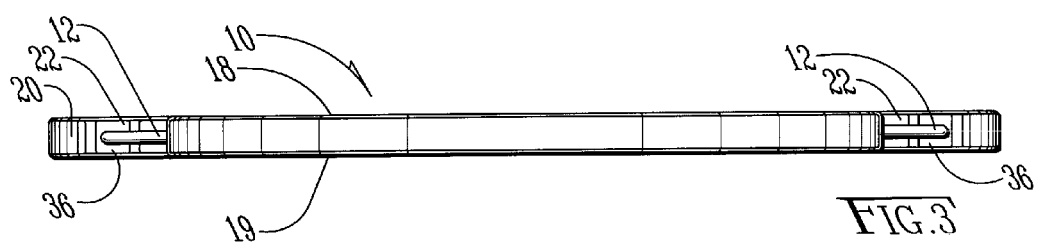
FIG. 3 is a front elevation view of the first embodiment of the stabilizer pad and handle apparatus.
Figure 4:
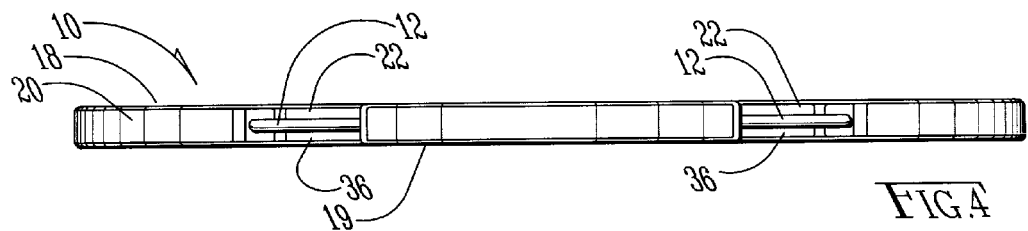
FIG. 4 is a side elevation view of the first embodiment of the stabilizer pad and handle apparatus.

FIG. 1 shows a perspective view of an embodiment of the stabilizer pad 10 and handle 12 with a sample stabilizer arm 14 and stabilizer platform 16 of a typical outrigger resting on the pad 10. The stabilizer pad and handle described here may be used for stabilization of any of a variety of such support devices, and the arm 14 and platform 16 here are shown for illustration of use of the device only. The stabilizer pad 10 may be constructed of any convenient material known to one skilled in the art, and the specific material used is not critical other than it should be capable of being drilled or shaped for inserting holes and formed into the shapes described. It will be noted that the embodiment of the invention shown in FIGS. 1-7 and 9-12 shows multiple handle means wherein the handle means comprises the handle, seating holes, and may include a recess and anchor holes and anchor means which are described in detail below; however, a further embodiment provides that one handle means may be provided as also elaborated below.

In a first embodiment, the stabilizer pad is round in shape, that is, substantially circular in shape. The substantially circular shape allows for the pad to be rolled on its edge and discussed further below. As shown in FIGS. 1-4, the pad 10 comprises a top wall 18, a bottom wall 19 and a side wall 20 which forms the outer perimeter of the pad 10. At least one recess 22 is provided in the pad 10 which accommodates the handle 12. The recess 22 is formed by a projection inward from the side wall 20 toward the interior of the pad 10. The recess is formed by a first side portion 24A, a second side portion 24B and connected by a base portion 26. An anchor means 28 may be provided for anchoring the handle 12 in place.

Figure 5:
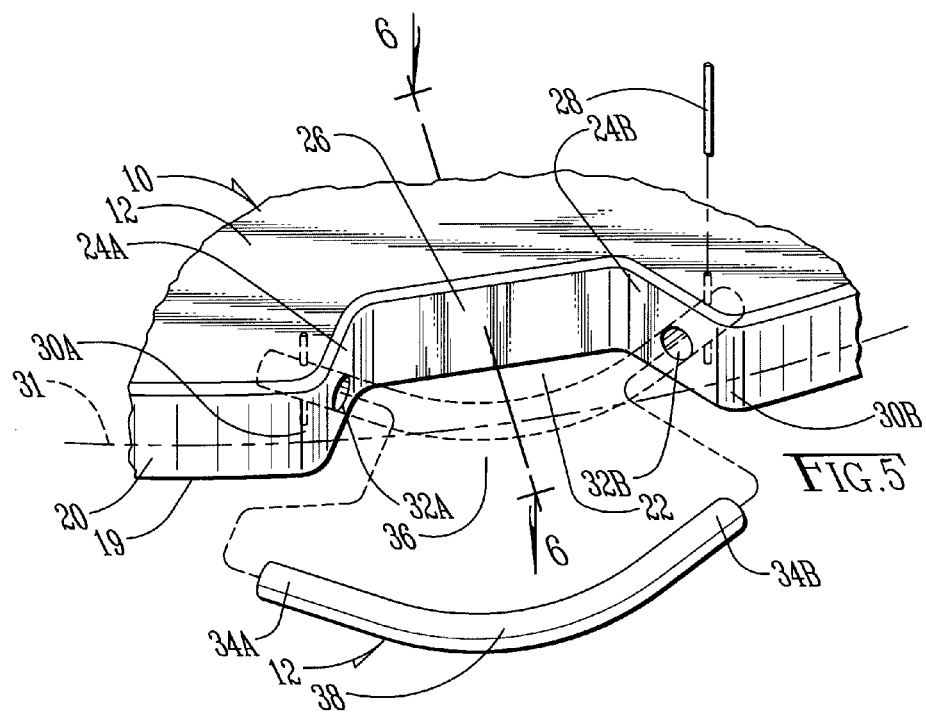
FIG. 5 is an exploded partial view taken along line 5-5 of FIG. 1 of an embodiment of the stabilizer pad and handle apparatus.
Figure 6:
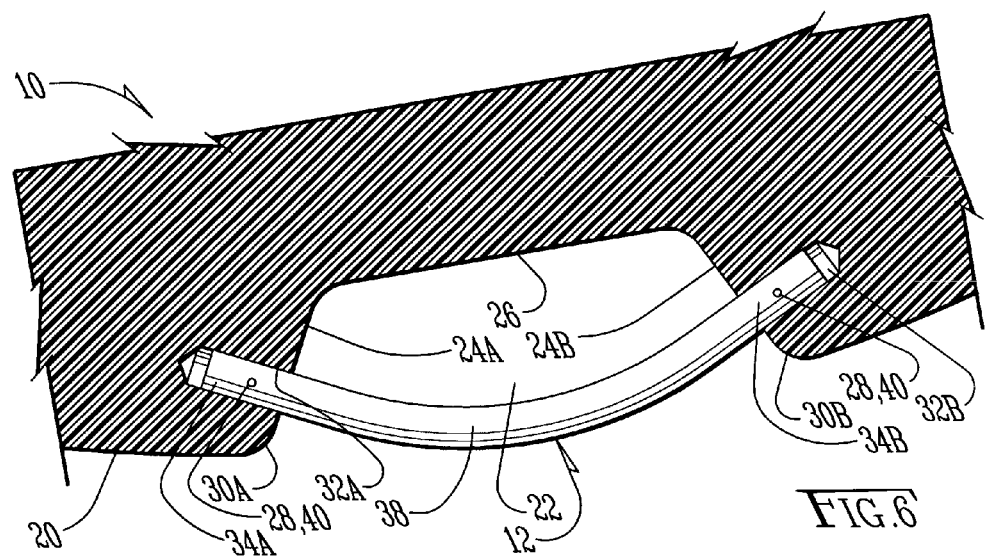
FIG. 6 is a cross sectional view taken along line 6-6 of FIG. 5 of an embodiment of the stabilizer pad and handle apparatus.

Further detail is provided in FIGS. 5 and 6 of the handle means comprising handle 12, means of seating and anchoring it, and the recess 22. In an embodiment the recess 22 is essentially trapezoidal in shape. The first side portion 24A and second side portion 24B extend from the side wall 20 inward toward the center of pad 20, and are connected at the distal end by a base portion 26. The base portion 26 is parallel to a line extending from the proximal edge 30A of first side portion 24A of the recess 22 to the proximal edge 30B of the second side portion 24B of the recess 26, illustrated as the line representing a portion of the outer circumference of the circle formed by the pad, the line represented at 31 in FIG. 5. In an embodiment the first side and second side portion 24A and 24B extend from the proximal side wall 20 distally inwardly toward the interior of the pad 10 at a narrowing incline toward one another. This results in the recess being narrower toward the base portion 26 than near line 31.

Each first and second side portion, 24A and 24B has a seating hole, 32A and 32B. Each seating hole 32A and 32B extend from the outer surface of the first and second side portion, 24A and 24B, and into pad 10. The distal ends 34A and 34B of handle 12 are inserted into seating holes with 34A inserting into the first seating hole 32A and the second distal end 34B inserting into second seating hole 32B. The seating holes 32A and 32B are placed at a point above the bottom wall 19 so that when distal ends 34A and 34B are inserted into seating holes 32A and 32B, and pad 10 is placed on a ground surface, there is a space 36 under handle 12 and above the ground surface sufficient to allow a hand or lifting equipment to be inserted for grasping or attaching to the handle. By way of example without limitation, the space 36 provided below handle 12 when placed on a ground surface is about ⅝ inch where the thickness of side wall 20 of about 2 inches. In another example the space 36 may be about ¼ inch when the thickness of side wall 20 is about one inch. A further example provides the space 36 is about 1/16 inch when the thickness of sidewall 20 is about ¾ inch. Clearly many variations are available depending on the circumstances. The handle can take any convenient shape, provided distal ends 34A and 34B may be inserted into seating holes 32A and 32B. In an embodiment the handle is substantially C-shaped. In an embodiment the diameter of the diameter of handle 12 is substantially round, and may be oblong or circular. The distal ends 34A and 34B may take any form that will allow insertion into seating holes 32A and 32B, and may be rounded, or may taper to a tip. One example provides the handle diameter may be about ½ (0.5) inch when used with a pad 10 having a side wall 20 thickness of from about 0.75 inches to about 1 inch. In another example, with a pad 10 having side wall 20 thickness of over one inch and over two inches handle diameter of about ⅝ (0.625) inch may be provided. This allows for adequate strength and thickness of handle 12 to handle the appropriate weight, and provides a space 36 providing a comfortable and ergonomically safe grip. A further embodiment provides the handle 12 is of uniform length to facilitate construction and in an example is about 8.5 inches in length. It is to be understood the foregoing measurements are provided by way of illustration and not intended to be limiting.

In an embodiment seating holes 32A and 32B are aligned at an angle to extend distally inwardly and away from the side wall 20, toward the interior of the pad 10 to allow the handle to be inserted into seating holes 32A and 32B and retain a substantially C-shape. The substantially C-shaped handle allows it to easily accommodate the width of a hand grasping the handle. In one embodiment the seating holes 32A and 32B are placed substantially perpendicular to side portions 34A or 34B. The placement aids in seating the handle to retain its' substantially C-shape and accommodate a hand. This embodiment facilitates grasping of the handle with the hand, so fingers are accommodated near the base portion 28 of recess 22 and the palm of the hand accommodated on the top outer surface 38 of handle 12. This also allows for minimal loss of material of pad 10 in forming the recess while still allowing for easy insertion of a hand for gripping. By way of example, and without intending to be limiting, a round pad with handles may be manufactured by readily available tools and equipment such that the base portion 28 of recess 22 is about 4 inches; the depth of the side portions 24A and 24B may be about 2.5 inches; and the opening formed at the outer circumference of line 31 may be about 8 inches. In another example, the angle of each of side portions 24A and 24B may be about 27° from a center line passing perpendicularly through base portion 28. The foregoing measurements are presented as an illustration and are not intended to be limiting.

In this manner, as illustrated in FIG. 7, placement of handle 12 in recess 22 by insertion into seating holes 32A and 32B and round shape of pad 10 allow pad 10 to be placed on its edge, with a portion of side wall 20 contacting a ground surface (meaning any surface on which the pad may be placed, whether earth, cement, asphalt, wood, or any other surface) and rolled, thereby being readily moved from one location to another with minimal effort. In a further embodiment, at least a portion of the top outer surface 38 of handle 12 is aligned with the outer circumference of the circle formed by pad 10. In an embodiment, at least a portion of top surface 38 of handle 12 is aligned with line 31 representing a portion of the circumference of the circle formed by the round pad 10. The handle 12 is thus on the same horizontal plane as pad 10 and extends laterally from the side wall and does not extend above pad 10 when the top or bottom wall is placed on a ground surface. When recessed handle 12 is inserted such that it does not extend above pad 10 and is retained within recess 22, it also avoids becoming a tripping hazard.

In a further embodiment, a means of securing the handle 12 in place may be used, by affixing, fusing, gluing or the like. In an embodiment, referring to FIG. 5, to anchor handle 12, there is provided an anchor hole, (which in this embodiment is shown as a pin hole) 40 to accommodate an anchor, shown here as a pin 28. Two such anchor holes 40 are provided, one extending downwardly from top wall 18 toward bottom wall 19, with one anchor hole 40 intersecting seating hole 34A and the other intersecting seating hole 34B. The terminal end 42 of anchor hole 40 can be placed at or below seating hole 34A and 34B, and may extend through to bottom wall 19. It should be noted that although reference is made to a "top" and "bottom" wall of pad 10, it does not matter when pad 10 is used by placement on a ground surface if top wall 18 faces up from the ground surface or down toward the ground surface. Further, though the anchor holes 40 and anchor means 28 are shown in this example as extending from the top wall 18 into the pad 10, it is possible to provide for any convenient placement of the anchor holes 40 and anchor means 28 as long as the anchor means passes into handle 12 for affixing to the pad 10. In another example, without being limiting, the anchor holes 40 and anchor means 28 may extend from the exterior of pad 10 at sidewall 20 at an angle such that it intersects the seating holes 34A or 34B and handle 12. When distal ends 34A and 34B of handle 12 are inserted into seating holes 32A and 32B, an anchor means 28 may be inserted into the anchor hole 40. An anchor means can be any device capable of holding handle 12 in place and in the present illustration is shown as a pin. The distal ends 34A and 34B may be provided with a matching hole aligned with anchor hole 40, for insertion of the anchor means, or, in an embodiment the anchor means can pierce the handle, providing for less construction. In an embodiment where anchor means 28 is a pin, it may be constructed from steel to provide strength and in an embodiment is constructed from stainless steel to reduce rusting. The pin in an embodiment is the length of the thickness of side wall 20. A further embodiment provides for a pin with a pointed tip to aid in piercing distal ends 34A and 34B of handle 12.

FIG. 8 shows an embodiment in which one handle means is provided, the handle means comprising handle 12, recess 22, seating holes 32A and 32B and may include anchor holes 40 and anchor means 28. As can be seen in FIGS. 1-7 in another embodiment of the round pad, multiple handle means may be provided. In an embodiment, two, three, four, five, six or more handle means may be provided. Any number of handle means that would be convenient may be provided, and in an embodiment, the number of handle means provided may be determined by weight of the pad, such that if a person is lifting the pad, they will be lifting no more than 50 pounds, decreasing the risk of injury. By way of example without intending to be limiting, if the pad is 50 pounds, one handle means can be provided, if 100 pounds, two handle means provided, if 150 pounds three handle means provided, and if 200 pounds four handle means provided. The pad may also be lifted by use of another machine which can engage the handle 12. In that instance, it may be most cost effective and convenient to provide fewer handles. Clearly, any number of handles may be provided.

In another embodiment pad 10 may be substantially rectangular or square. FIGS. 9-12 show an embodiment of the invention in which pad 10 is square in shape, having four side walls 20. In the embodiment pad 10 may be provided with a substantially U-shaped handle 12. In this embodiment no recessed area is provided with the handle means and handle 12 is inserted by insertion of distal ends 34A and 34B into seating holes 32A and 32B which extend from the outer surface of and substantially perpendicular to one side wall 20 toward the interior of the pad. As described above, a pair of anchor holes 40 may extend downwardly from the top wall 18 of pad 10 toward bottom wall 19 and each intersect one of seating holes 32A and 32B. In one example where the pad is manufactured using readily available tools and equipment, the seating holes 32A and 32B may extend about one inch to about two inches and in another example one and three-eights inches into pad 10. In another example where the pad is manufactured using readily available tools and equipment, the seating holes 32A and 32B may be at a distance of about six inches from one another. The foregoing measurements are provide by way of illustration and not intended to be limiting. A pair of anchor means, shown here as a pin 28, each extend through one of anchor holes 40, and either pierce distal end 34A or 34B of handle 12, or pass through an optional hole extending through distal ends 34A and 34B, as described above.

The handle 12 in an embodiment is constructed from material that allows it to be placed into seating holes 34A and 34B, maintain its' substantially C-shape or substantially U-shape configuration and yet not split when pierced with anchor means 28. Handle 12 in an embodiment is of sufficient strength, shear and tear resistance to not crack, tear or break when being used to pull a stabilizer pad. Since the stabilizer pad handle 12 will be subject to various and extreme weather conditions, in an embodiment it is resistant to weathering. Another embodiment provides the handle is of solid core design for both strength and to retain the anchor means 28 holding the handle 12 in place. In an embodiment the handle is constructed from engineered thermoplastics. It has been found that due to its material properties, such thermoplastics have exceptional tensile strength, tear resistance and consistent performance in extreme operating temperatures and may be used to construct the handle. Still another embodiment provides for treatment to protect handle 12 from exposure to UV light. One example of such treatment is to include in the manufacturing of the handle a pigment, which can block UV light. Where in one embodiment the pigment is orange in color, it will provide increased visibility and enhanced safety and also block UV light. Any method of treatment for UV protection, however, may be used, whether coating with a protective substance or any other available method. The recess may be formed by cutting material from the pad or by preparing a form which includes the recess, or any other convenient method.

Other features and advantages of the apparatus are described herein. The foregoing is presented by way of illustration and not limitation and various modifications will be understood to one skilled in that art.

What is claimed is:

1. A stabilizer pad apparatus for stabilizing a jack or outrigger from a heavy equipment when resting on a ground surface, comprising:
   a) a pad having a top wall, a bottom wall and downwardly depending side wall, said pad having a substantially circular shape, wherein the top wall is configured for the jack or outrigger mount thereon;
   b) a pad grasping device comprising,
      i. a recess in said pad, said recess formed by first and second side portions extending from the proximal outer surface of said side wall inwardly to a first distal end and a second distal end, and a base portion connecting said first and second distal ends of said side portions;
      ii. a pair of seating holes, one of said pair of seating holes extending from the outer surface of said first side portion into said pad, the other of said pair of seating holes extending from the outer surface of said second side portion into said pad; and
      iii. a handle having a first and second distal end, said first distal end inserted into one of said pair of seating holes, said second distal end inserted into the other of said pair of seating holes such that said handle is contained within said recess, such that when at least a portion of said side wall is in contact with said ground surface said apparatus may be rolled along said ground surface.

2. The stabilizer pad apparatus of claim 1, further comprising,
   i. a pair of anchor holes, one of said pair of anchor holes extending from the exterior of said pad into one of said pair of seating holes, the other of said pair of anchor holes extending from the exterior of said pad into the other of said pair of seating holes; and
   ii. a pair of anchors affixing said handle to said pad, one of said pair of anchors extending through one of said pair of anchor holes and into said first distal end of said handle, the other of said pair extending through the other of said pair of anchor holes and into said second distal end of said handle.

3. The stabilizer pad apparatus of claim 2, wherein one of said pair of anchor holes is substantially perpendicular to and extending into one of said pair of seating holes, the other of said pair of anchor holes substantially perpendicular to and extending into the other of said pair of seating holes.

4. The stabilizer pad apparatus of claim 1, wherein said first and second side portions extend from said proximal outer surface inwardly at a narrowing incline toward each other.

5. The stabilizer pad apparatus of claim 1, wherein said recess is substantially trapezoidal in shape.

6. The stabilizer pad apparatus of claim 1, wherein said substantially circular shape of said pad forms an outer circumference of said circle and at least a portion of the top surface of said handle is aligned with said outer circumference of said pad such that when said pad is rolled along a ground surface said at least a portion of said top surface of said handle comes into contact with said ground surface.

7. The stabilizer pad apparatus of claim 1, wherein said pair of seating holes are placed in said first and second side portions such that when said handle is inserted in said seating holes and said pad is placed with said top or bottom wall a ground surface, a space is formed below said handle to allow insertion of a hand.

8. The stabilizer pad apparatus of claim 1, wherein said handle is substantially C-shaped.

9. The stabilizer pad apparatus of claim 1, wherein said seating holes extend into said pad at an angle substantially perpendicular to said outer surface of said side portion.

10. The stabilizer pad apparatus of claim 1, wherein said handle comprises orange pigment.

11. The stabilizer pad apparatus of claim 1, wherein said handle comprises rigid material.

12. The stabilizer pad apparatus of claim 1, wherein said handle is solid core and constructed from thermoplastic material.

13. The stabilizer pad apparatus of claim 1, wherein said apparatus comprises more than one pad grasping device.

14. The stabilizer pad apparatus of claim 1, wherein said apparatus comprises four pad grasping devices.

15. The stabilizer pad apparatus of claim 1, wherein said handle is capable of being grasped by a human hand and said pad moved by at least one human.

16. The stabilizer pad apparatus of claim 1, wherein said handle is capable of being grasped by a device and said pad moved by said at least one device.

17. A stabilizer pad apparatus for stabilizing a jack or outrigger from a heavy equipment when resting on a ground surface, comprising:
   a) a pad having a top wall, a bottom wall and downwardly depending side wall, said pad having a substantially circular shape having an outer circumference, wherein the top wall is configured for the jack or outrigger mount thereon;
   b) a pad grasping device comprising,
      i. a recess in said pad substantially trapezoidal in shape, formed by first and second side portions extending from the proximal outer surface of said side wall inwardly at a narrowing incline toward each other and a base portion connecting said first and second portions;

ii. a pair of seating holes, one of said pair of seating holes extending from the outer surface of said first side portion into said pad, the other of said pair of seating holes extending from the outer surface of said second side portion into said pad, said pair of seating holes placed in said first and second side portions such that when said handle is inserted in said seating holes and said pad is placed with said top or bottom wall on said ground surface, a space is formed below said handle to allow insertion of a hand;

iii. a pair of anchor holes, one of said pair of anchor holes substantially perpendicular to and extending into one of said pair of seating holes, the other of said pair of anchor holes substantially perpendicular to and extending into the other of said pair of seating holes;

iv. a substantially C-shaped handle having a first and second distal end and a top surface, said first distal end inserted into one of said pair of seating holes, said second distal end inserted into the other of said pair of seating holes and at least a portion of said top surface is aligned with said outer circumference of said circle, such that said handle is contained within said recess and when said pad is rolled along a ground surface said at least a portion of said top surface of said handle comes into contact with said ground surface; and v. a pair of anchors affixing said handle to said pad, one of said pair of anchors extending through one of said pair of anchor holes and into said first distal end of said handle, the other of said pair extending through the other of said pair of anchor holes and into said second distal end of said handle, such that when at least a portion of said side wall is in contact with a ground surface said apparatus may be rolled along said ground surface.

18. The stabilizer pad apparatus of claim 17, wherein said handle is solid core and constructed from thermoplastic material.

19. The stabilizer pad apparatus of claim 17, wherein said seating holes extend into said pad at an angle substantially perpendicular to said outer surface of said side portion.

20. The stabilizer pad apparatus of claim 17, wherein said handle is capable of being grasped by a human hand and said pad moved by at least one human.

21. The stabilizer pad apparatus of claim 17, wherein said handle is capable of being grasped by a device and said pad moved by said at least one device.

* * * * *